(12) United States Patent
Kim et al.

(10) Patent No.: US 11,970,090 B2
(45) Date of Patent: Apr. 30, 2024

(54) RAILLESS VARIABLE SEATBACK TYPE REAR SEAT

(71) Applicants: HYUNDAI MOTOR COMPANY, Seoul (KR); Kia Corporation, Seoul (KR); Daechang Seat Co.,LTD-Dongtan, Hwaseong-si (KR); Hyundai Transys Inc., Seosan-si (KR)

(72) Inventors: Seung-Hyun Kim, Daejeon (KR); Sang-Hyun Lee, Anyang-si (KR); Min-Ju Lee, Hwaseong-si (KR); Byung-Yong Choi, Hwaseong-si (KR); Chan-Ho Jung, Gunpo-si (KR); Seon-Chae Na, Yongin-si (KR); Young-Woon Choi, Hwaseong-si (KR); Jae-Jin Lee, Yongin-si (KR); Dong-Hwan Kim, Yongin-si (KR); In-Chang Hwang, Ulsan (KR)

(73) Assignees: HYUNDAI MOTOR COMPANY, Seoul (KR); Kia Corporation, Seoul (KR); Daechang Seat Co.,LTD-Dongtan, Hwaseong-si (KR); Hyundai Transys Inc., Seosan-si (KR)

( * ) Notice: Subject to any disclaimer, the term of this patent is extended or adjusted under 35 U.S.C. 154(b) by 192 days.

(21) Appl. No.: 17/380,504

(22) Filed: Jul. 20, 2021

(65) Prior Publication Data
US 2022/0297578 A1     Sep. 22, 2022

(30) Foreign Application Priority Data

Mar. 17, 2021    (KR) .................. 10-2021-0034783

(51) Int. Cl.
*B60N 2/06*    (2006.01)
*B60N 2/02*    (2006.01)
(Continued)

(52) U.S. Cl.
CPC ......... *B60N 2/067* (2013.01); *B60N 2/02246* (2023.08); *B60N 2/065* (2013.01);
(Continued)

(58) Field of Classification Search
CPC ...... B60N 2/067; B60N 2/0232; B60N 2/065; B60N 2/2209; B60N 2002/0236; B60N 2002/024
(Continued)

(56) References Cited

U.S. PATENT DOCUMENTS 2,170,923 A * 8/1939 Jacobs ................ B60N 2/1675
248/394
2,174,636 A * 10/1939 McGregor ........... B60N 2/0825
248/394
(Continued)

FOREIGN PATENT DOCUMENTS

KR    10-0778590 B1    11/2007

*Primary Examiner* — Nkeisha Smith
(74) *Attorney, Agent, or Firm* — Lempia Summerfield Katz LLC

(57) ABSTRACT

A railess variable seatback type rear seat includes: a linear movement device configured to convert a rotation of a motor into a linear movement; a sliding movement device configured to convert the linear movement into a sliding movement in which a seat cushion is pushed forward or backward; and a reclining angle change device configured to convert the sliding movement into a reclining movement, and to fold a seatback, which is connected to the seat cushion, forward or to recline the seatback backward.

19 Claims, 12 Drawing Sheets

(51) Int. Cl.
*B60N 2/07* (2006.01)
*B60N 2/22* (2006.01)

(52) U.S. Cl.
CPC ........ *B60N 2/2209* (2013.01); *B60N 2/02253* (2023.08); *B60N 2/02258* (2023.08)

(58) Field of Classification Search
USPC .................................................. 248/428, 429
See application file for complete search history.

(56) References Cited

U.S. PATENT DOCUMENTS

| | | | | |
|---|---|---|---|---|
| 3,552,795 | A * | 1/1971 | Perkins et al. | B60N 2/42736 248/430 |
| 4,159,815 | A * | 7/1979 | Strowik | B60N 2/08 74/530 |
| 9,908,445 | B2 * | 3/2018 | Park | B60N 2/309 |
| 9,914,431 | B2 * | 3/2018 | Tsunoda | B60R 25/2036 |
| 10,029,585 | B2 * | 7/2018 | Frye | B60N 2/0296 |
| 10,065,536 | B2 * | 9/2018 | Poniatowski | B60N 2/43 |
| 10,857,910 | B2 * | 12/2020 | Madhu | B60N 2/123 |
| 11,548,419 | B2 * | 1/2023 | Moulin | B60N 2/3031 |
| 2006/0169863 | A1 * | 8/2006 | Ohtsubo | B60N 2/181 248/429 |
| 2008/0106135 | A1 | 5/2008 | Jeong | |
| 2012/0223561 | A1 * | 9/2012 | Hurst, III | B60N 2/12 297/344.1 |
| 2022/0305959 | A1 * | 9/2022 | Kim | B60N 2/0232 |

* cited by examiner

FIG.2
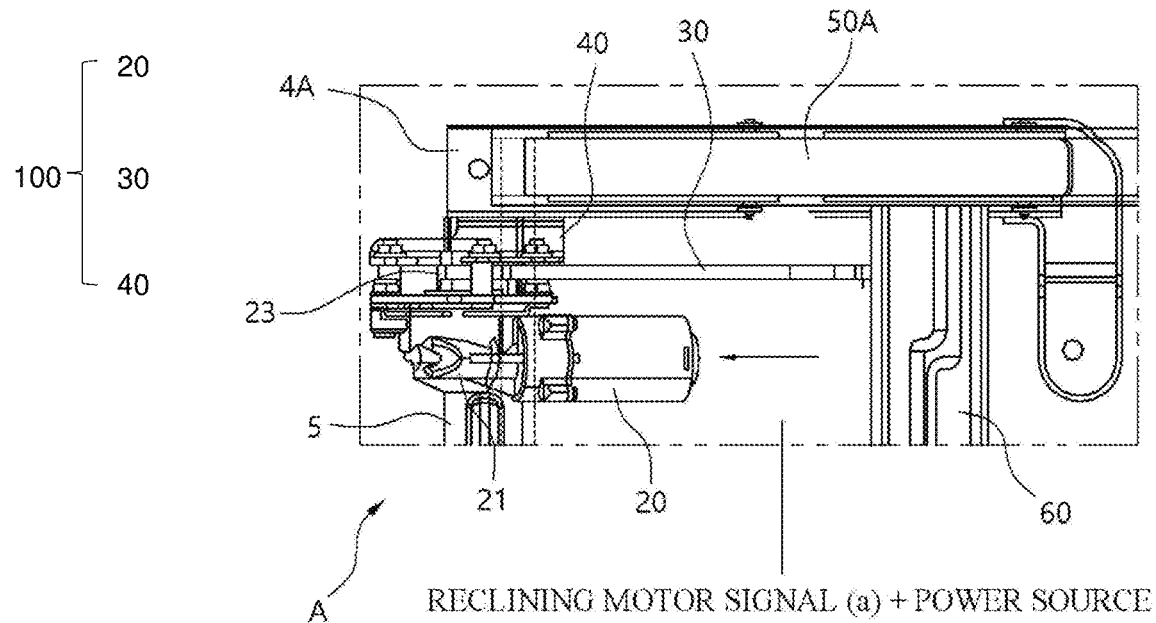
RECLINING MOTOR SIGNAL (a) + POWER SOURCE
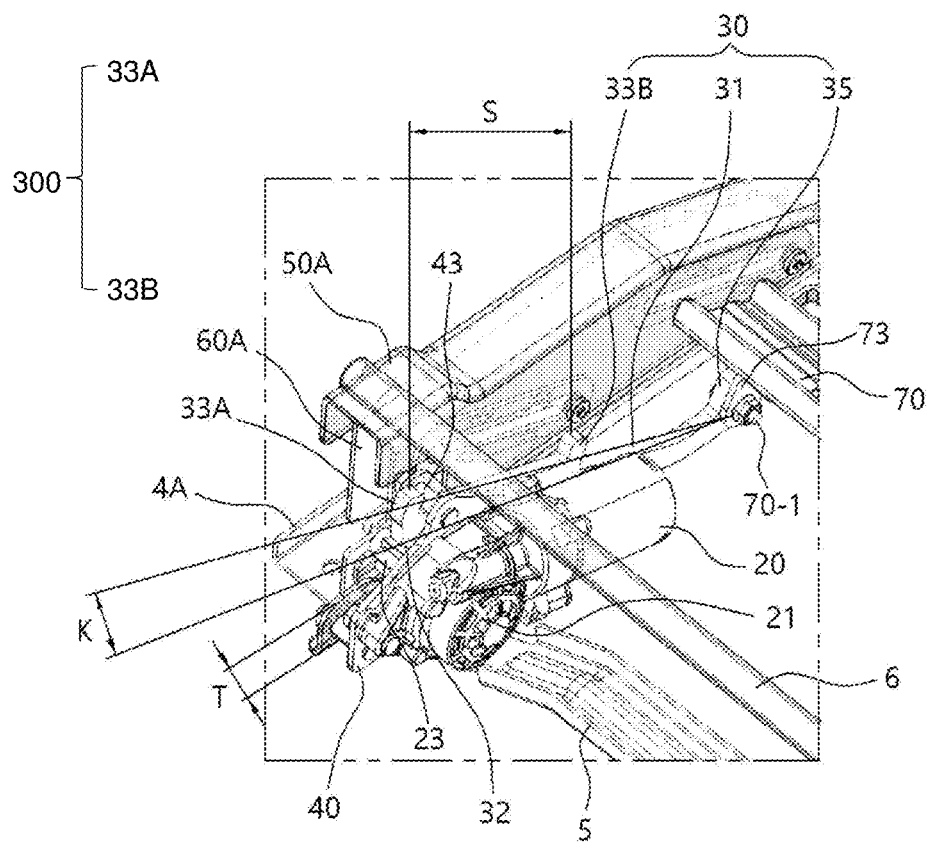
[A DIRECTIONAL PERSPECTIVE DIAGRAM]

FIG.5
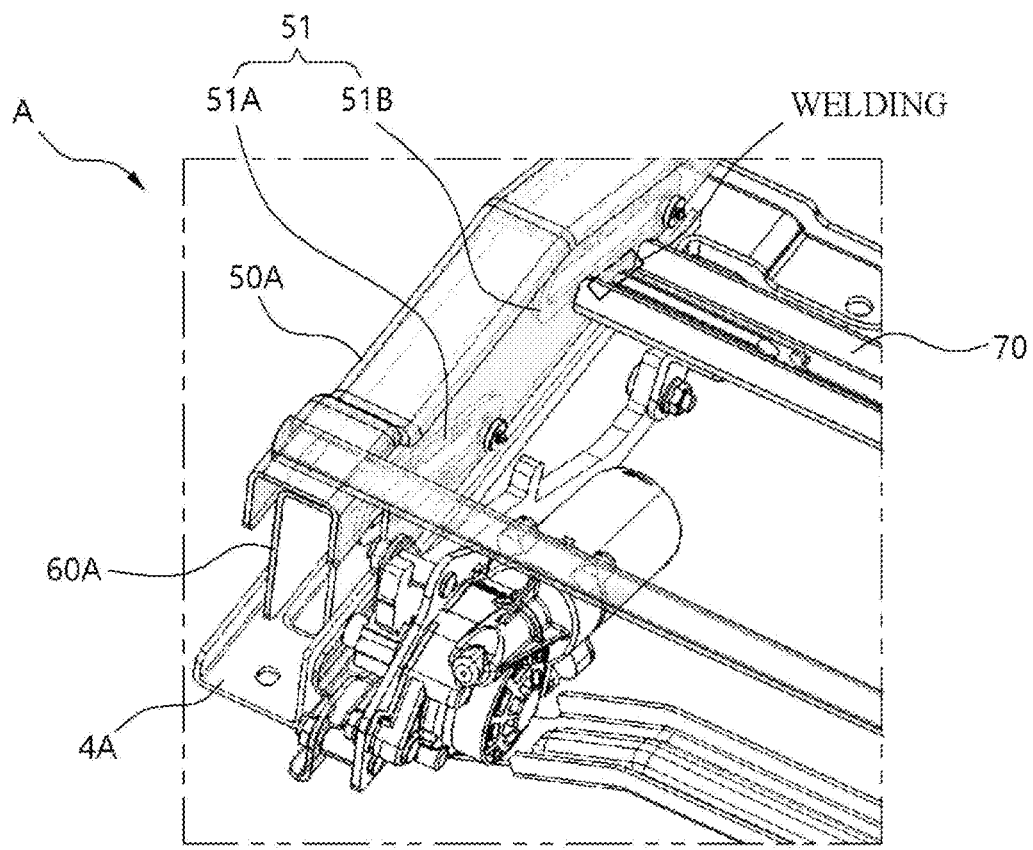
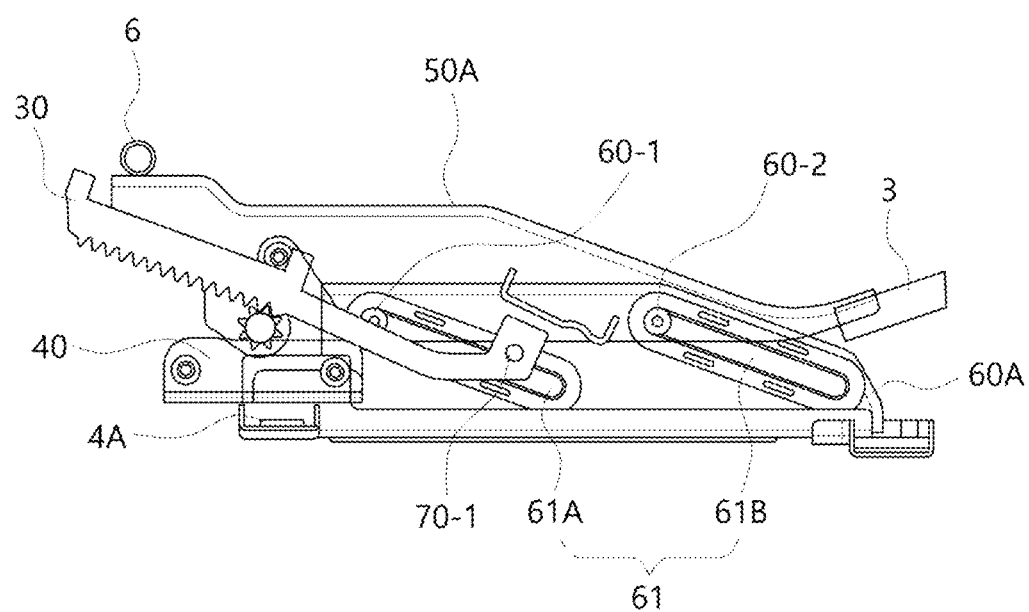
[A DIRECTIONAL SIDE DIAGRAM]

[SECTION A-A]

FIG.11
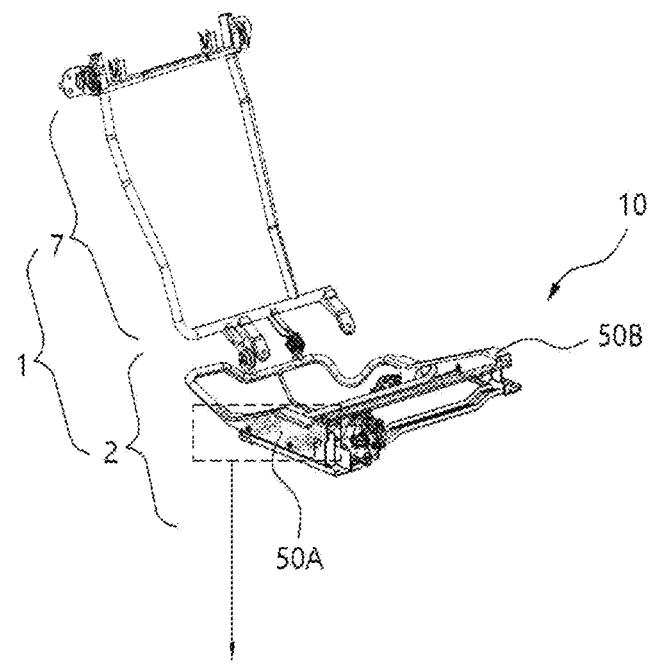
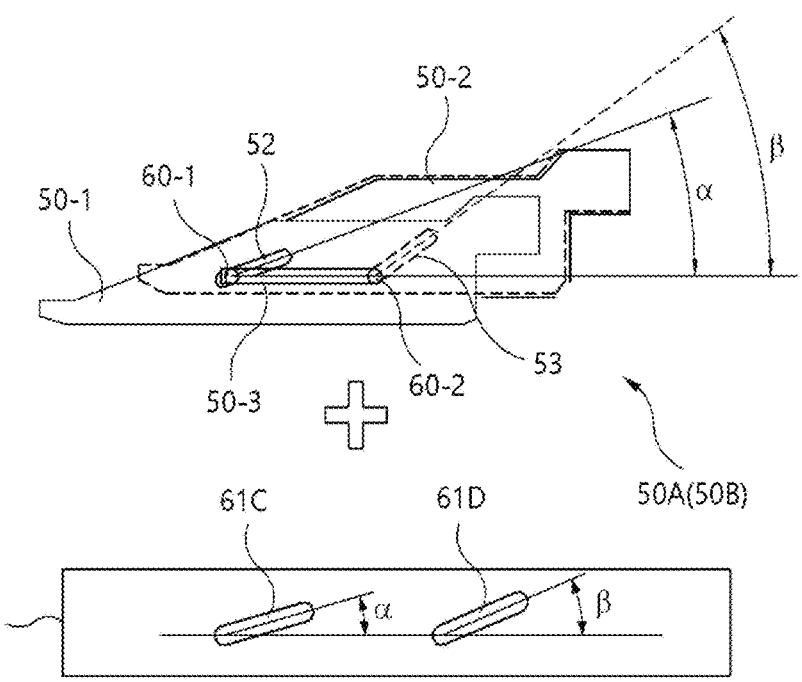

RAILLESS VARIABLE SEATBACK TYPE REAR SEAT

CROSS-REFERENCE TO RELATED APPLICATION

This application claims priority to and the benefit of Korean Patent Application No. 10-2021-0034783, filed on Mar. 17, 2021, the entire contents of which are incorporated herein by reference.

FIELD

The present disclosure relates to a rear seat for a vehicle.

BACKGROUND

The statements in this section merely provide background information related to the present disclosure and may not constitute prior art.

Generally, there is a difference in that a front seat for a vehicle is a variable seatback structure in which the reclining of the seatback is available whereas a rear seat is not available for the reclining of a seatback due to a fixed seatback structure.

Therefore, the reclining of the seatback inevitably gives the discomfort to a fixed seatback type rear seat due to the passenger's posture for the long-distance traveling of 1 hour or more.

Therefore, in recent years, there is the tendency of applying a variable seatback type rear seat using a rail type seatback angle adjustment mechanism in some vehicle models such as a luxury sedan.

As an example, the rail type seatback angle adjustment mechanism includes a seatback motor, a pair of inner/outer rails of the left and right sides, a slot hole guide/a mounting bracket, and other brackets, and therefore, a reclining function may be implemented in the seatback of the rear seat to be operated as the variable seatback type rear seat.

That is, the rail type seatback angle adjustment mechanism may allow a passenger to implement a comfortable posture with a seatback angle adjustment function using a sliding function as an operation principle by performing an operation during which a driving of a motor → a sliding of a cushion→ a forward movement of the seatback connected to a cushion by a hinge along a slot hole guide on the upper portion of the seatback→ the completion of a reclining in which the seatback is reclined. In this case, the "→" means the proceeding order of the operation.

Therefore, the passenger reclines the seatback by the rail type seatback angle adjustment mechanism even when seating on the rear seat, thereby being free from the discomfort posture even for the long-distance traveling of 1 hour or more.

However, the rear seat with the rail type seatback angle adjustment mechanism has the limitation of being applied to only a luxury sedan among vehicle models.

This is because the seatback angle adjustment mechanism of the rear seat includes a pair of an inner rail and an outer rail for a seat sliding function in addition to the power of a motor, thereby increasing the weight as well as increasing the cost and the material cost due to additional rail members.

Therefore, the application of the rear seat having the rail type seatback angle adjustment mechanism to medium/small vehicle models other than the luxury sedan may inevitably weaken the cost competitiveness.

SUMMARY

The present disclosure provides a railless variable seatback type rear seat, which may implement a reclining operation for a seatback by converting the power of a motor into a gear combination of a rack and a pinion or a lead screw, and particularly, extend the application area to medium/small sedans in addition to a luxury sedan by removing a structure with a pair of rails causing an increase in the cost/the material cost/the weight because a seat sliding operation of a reclining mechanism of the seatback is based on the gear combination structure.

A rear seat according to one form of the present disclosure includes a linear movement device converting the rotation of a motor into a linear movement, a sliding movement device converting the linear movement into a sliding movement in which a seat cushion is pushed forward or backward, and a reclining angle change device converting the sliding movement into a reclining movement and folding a seatback connected to the seat cushion forward or reclining the seatback backward.

As a preferred exemplary form, the linear movement device is positioned on a first side portion of the seat cushion or on a center portion of the seat cushion.

As the preferred exemplary form, the linear movement device includes a motor in which the rotation of the motor is generated, a sliding member configured to convert the rotation of the motor into the linear movement and to generate the sliding movement for the sliding movement device by the linear movement, and a motor mounting bracket fixing the motor on the first side portion of the seat cushion.

As the preferred exemplary form, the motor and the sliding member are connected by a gear mechanism, and the gear mechanism includes a pinion gear configured to receive the rotation of the motor, and a rack gear formed on a rack gear rod that performs the linear movement to be engaged with the pinion gear.

As the preferred exemplary form, the pinion gear is positioned at a gear interval of the motor mounting bracket, and the rack gear rod is fixed to a rear seat cross member of the sliding movement device to form a sliding angle upward.

As the preferred exemplary form, the rack gear rod forms a sliding stopper on an opposite side of the rack gear, and the sliding stopper limits a movement distance of the sliding movement by a sliding stroke.

As the preferred exemplary form, the sliding stopper includes a front end protrusion and a rear end protrusion contacting an interval pin of the motor mounting bracket, and an interval of the front end protrusion and the rear end protrusion is set by the sliding stroke.

As the preferred exemplary form, the linear movement device includes a motor in which the rotation of the motor is generated, a sliding member configured to convert the rotation of the motor into the linear movement and to generate the sliding movement for the sliding movement device by the linear movement, and a cross member bracket fixing the motor on a center portion of the seat cushion.

As the preferred exemplary form, the motor and the sliding member are connected by a motor reducer, and the sliding member is a lead screw.

As the preferred exemplary form, the sliding movement device includes a rear seat cross member fixing the sliding member of the linear movement device and forming a seat cushion movement distance by the sliding movement, a side upper bracket fixed to the rear seat cross member and forming a side upper bracket movement distance by the sliding movement, a leg bracket coupled such that the side upper bracket has a relative movement, and a slot pin allowing the relative movement of the side upper bracket with respect to the leg bracket.

As the preferred exemplary form, the rear seat cross member fixes the sliding member on a lower surface portion or an upper surface portion thereof.

As the preferred exemplary form, the slot pin is positioned on a guide slot of the leg bracket to be moved together with the side upper bracket.

As the preferred exemplary form, the guide slot includes a front inclination slot and a rear inclination slot, the front inclination slot and the rear inclination slot is spaced apart from each other at an interval and each the front inclination slot and the rear inclination slot has the slot pin positioned, respectively, and each of the front inclination slot and the rear inclination slot forms an upward inclination consistent with the sliding angle of the linear movement device.

As the preferred exemplary form, the sliding movement device includes: a rear seat cross member fixing the sliding member of the linear movement device and forming a seat cushion movement distance by the sliding movement; a pair of a side upper movement bracket and a side upper tilt bracket separated from each other, the pair configured to be moved together with the rear seat cross member by the sliding movement, form a side upper bracket distance, and increase a height of the seat cushion to a seat cushion tilt height; a tilt link connecting the side upper movement bracket to the side upper tilt bracket; a leg bracket coupled such that the side upper bracket has a relative movement; and a slot pin fixed to the tilt link and configured to allow the relative movement of the side upper movement bracket and the side upper tilt bracket with respect to the leg bracket.

As the preferred exemplary form, the slot pin is positioned on a guide slot of the leg bracket to be moved together with the side upper movement bracket and the side upper tilt bracket.

As the preferred exemplary form, the guide slot includes a reference inclination slot and a tilt inclination slot, the reference inclination slot and the tilt inclination slot being spaced apart from each other at an interval, and the slot pin is positioned on each of the reference inclination slot and the tilt inclination slot. The tilt link provides the sliding movement to the side upper movement bracket and the side upper tilt bracket and allows the seat cushion tilt height to be formed by the relative movement of the side upper tilt bracket with respect to the side upper movement bracket.

As the preferred exemplary form, the seat cushion tilt height is formed by an upward angle difference between the reference inclination slot and the tilt inclination slot, and the upward angle difference is formed by setting a tilt inclination angle of the tilt inclination slot to be greater than a reference inclination angle of the reference inclination slot.

As the preferred exemplary form, the reclining angle change device includes a hinge connecting the seat cushion to the seat back, and a back mounting bracket forming a shaft long hole and forming the reclining movement at a seatback reclining distance at which a fixing shaft fixed to the seatback moves in the shaft long hole.

As the preferred exemplary form, the back mounting bracket is positioned on an upper portion of the seatback.

The railless variable seatback type rear seat according to the present disclosure implements the following operations and effects.

First, the rear seat may implement the seatback reclining operation by the railless sliding mechanism of the combination of the rack and the pinion, thereby improving the structure within the seat. Second, it is possible to reduce the cost, the material cost, and the weight by about 15% or more by the railless sliding mechanism by removing the structure with the pair of rails applied conventionally, compared to the conventional reclining structure. Third, it is possible for the passenger to take the comfortable posture for the long-distance traveling of 1 hour or more by the availability of the seatback angle adjustment of the rear seat, thereby improving the customer's satisfaction. Fourth, it is possible to increase the merchantability of the vehicle by applying the rear seat with the seatback angle adjustment function to the medium/small sedans in addition to the luxury sedan. Fifth, the rear seat may simultaneously apply the tilting function of the seatback together with the seatback reclining function, thereby increasing the comport performance for the rear seat.

DRAWINGS

In order that the disclosure may be well understood, there will now be described various forms thereof, given by way of example, reference being made to the accompanying drawings, in which:

FIG. 2 is a diagram illustrating a configuration of a motor and a sliding member of a linear movement device configuring a railless sliding mechanism according to one form of the present disclosure;

FIG. 5 is a diagram illustrating a configuration of a bracket member of a sliding movement device configuring the railless sliding mechanism according to one form of the present disclosure;

FIG. 11 is a diagram illustrating an example in which the rear seat according to one form of the present disclosure combines a tilt mechanism of the seat cushion together with a railless sliding mechanism.

Figure 1:
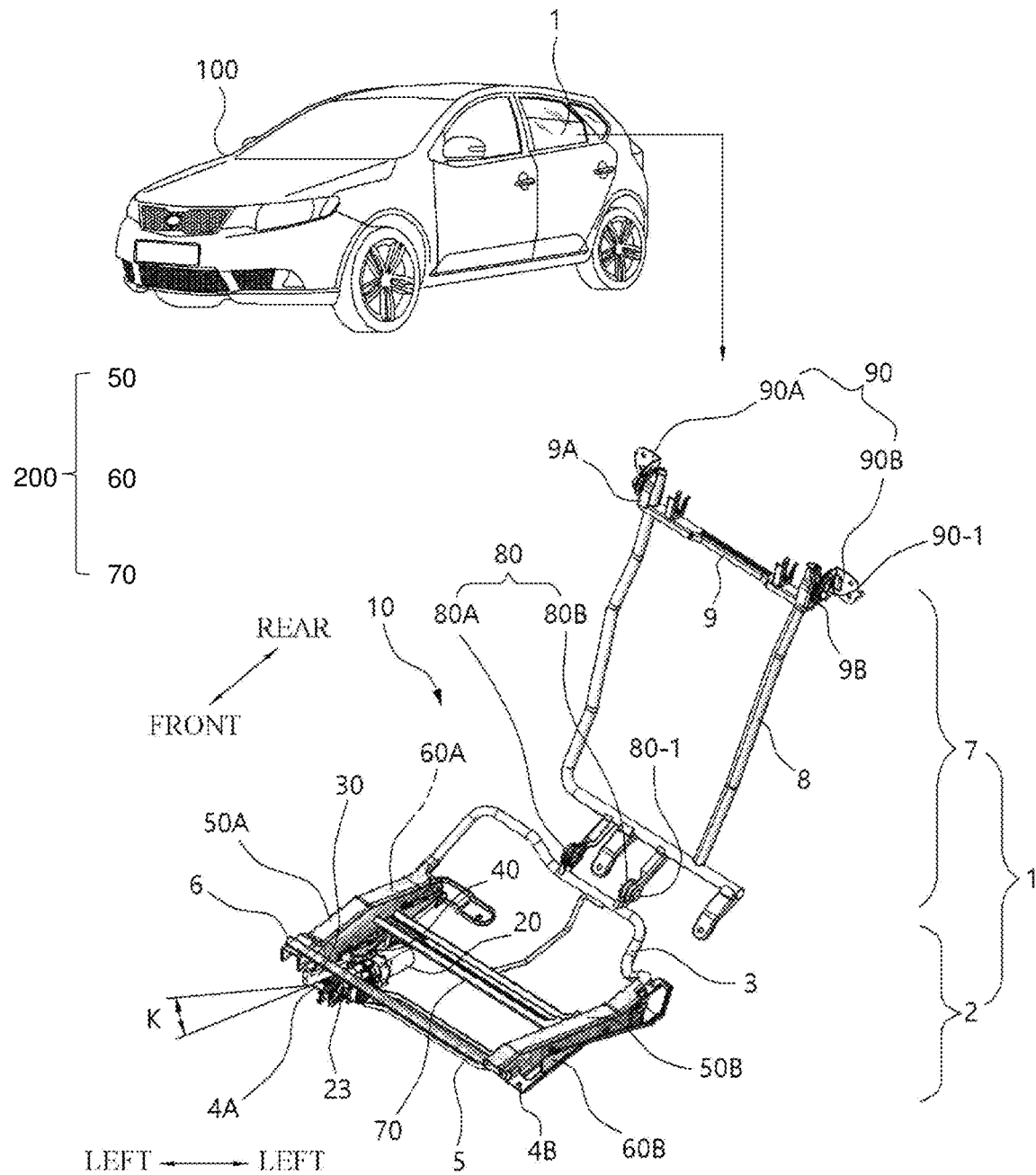
FIG. 1 is a diagram illustrating a configuration of a railless variable seatback type rear seat according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an exemplary form of the present disclosure will be described in detail with reference to accompanying exemplary drawings, and the exemplary form is illustrative and may be implemented by those skilled in the art to which the present disclosure pertains in various different forms, and thus is not limited to the exemplary form described herein.

Referring to FIG. 1, a rear seat 1 applied to a vehicle 100 includes a railless sliding mechanism 10. In this case, the vehicle 100 is not specified to one vehicle model by including medium/small sedans in addition to a luxury sedan.

Specifically, the rear seat 1 includes of a seat cushion 2 on which a passenger sits and a seatback 7 on which the passenger may lean.

As an example, the seat cushion 2 has a cushion frame 3 connected to the rear thereof, a front cross member 5 connected to the front thereof, and a cushion frame cross bar 6 for strengthening rigidity arranged at the center position thereof with respect to a left cushion mounting bracket 4A and a right cushion mounting bracket 4B of a predetermined length with a mounting structure which may be assembled to a vehicle body at a predetermined width interval, thereby entirely forming the skeleton of a "☐" shape and being surrounded by a seat cushion pad (not illustrated).

As an example, the seatback 7 has a back frame cross bar 9 for strengthening rigidity crossing on the upper portion of the back frame 8 of a predetermined size, thereby entirely forming the skeleton of a "☐" shape and being surrounded by a seatback cushion pad (not illustrated). In this case, the back frame cross bar 9 is coupled such that the back frame 8 may be tilted and moved upward/downward in a state of being not moved by a back mounting bracket 90 fixed to a vehicle body (not illustrated).

Particularly, the cushion frame 3 and the back frame 8 are connected by a hinge 80 including a pair of a first hinge 80A and a second hinge 80B, and connected to left/right cross ends 9A, 9B of the back frame cross bar 9 by the back mounting bracket 90 having a pair of a left back mounting bracket 90A and a right back mounting bracket 90B, such that an angle of the back frame 8 is adjusted by the reclining upon the sliding movement of the cushion frame 3.

Further, the front cross member 5 has both sides connected to the left/right cushion mounting brackets 4A, 4B and has a motor mounting bracket 40 for fixing a motor welded. Both portions of the cushion frame cross bar 6 are placed on a left side upper bracket 50A and a right side upper bracket 50B.

Therefore, the seat cushion 2 and the seatback 7 of the rear seat 1 are general components of a rear seat, but there is a difference in that a side upper bracket 50 of the railless sliding mechanism 10 is connected to the left/right cushion mounting brackets 4A, 4B, the hinge 80 hinge-connects the cushion frame 3 to the back frame 8, and the back mounting bracket 90 hinge-connects the back frame cross bar 9.

Specifically, the railless sliding mechanism 10 includes a linear movement device 100, a sliding movement devices 200, and a reclining angle change device 90.

Specifically, the linear movement device 100 includes a motor 20, a sliding member 30, and a motor mounting bracket 40 and converts the rotation of the motor into the linear movement.

As an example, the motor 20 generates the power of a reclining structure and rotates a pinion gear 23. The sliding member 30 converts the rotation motion of the motor 20 into the linear motion through a rack gear 32 (see FIG. 2) engaged with the pinion gear 23 and forms a sliding angle (K) of a predetermined angle (i.e., acute angle) upward in a state of being fixed to a rear seat cross member 70.

Therefore, the motor 20 and the sliding member 30 apply, as a gear mechanism, a gear combination of the pinion gear 23 and the rack gear 32 to the sliding movement of the cushion frame 3 and the reclining angle change of the back frame 8.

As an example, the motor mounting bracket 40 fixes the motor 20 and is coupled to the left cushion mounting bracket 4A to position the motor 20 and the sliding member 30 on one side portion (i.e., left portion) of the seat cushion 2.

Specifically, the sliding movement device 200 includes the side upper bracket 50, a leg bracket 60, and the rear seat cross member 70 and convert the linear movement of the linear movement device 100 into the sliding movement in which the seat cushion 2 is pushed forward or backward.

As an example, the side upper bracket 50 and the leg bracket 60 are coupled to each other. In this case, the side upper bracket 50 includes a pair of a left side upper bracket 50A and a right side upper bracket 50B for supporting the left and right of the seat cushion and is fixed to the rear seat cross member 70 to move together with the rear seat cross member 70, whereas the leg bracket 60 includes a pair of a left leg bracket 60A and a right leg bracket 60B for supporting the left and right of the seat cushion and is coupled to the left/right side upper brackets 50A, 50B in a state of being fixed to the left/right cushion mounting brackets 4A, 4B and not moving.

Particularly, the left side upper bracket 50A and the right side upper bracket 50B of the side upper bracket 50 move together with the rear seat cross member 70 by the linear motion according to front/rear inclination slots 61A, 61B (see FIG. 5) of a guide slot 61 formed on the left leg bracket 60A and the right leg bracket 60B.

As an example, the rear seat cross member 70 is connected to a rack gear rod 31 of the sliding member 30 by a hinge bolt 70-1 (see FIG. 2) and delivers the power received from the rack gear rod 31 to the left side upper bracket 50A and the right side upper bracket 50B having both sides fixed by welding (see FIG. 5).

Specifically, the reclining angle change device 90 converts the sliding movement of the sliding movement device into the reclining movement in which the seatback 7 is reclined backward or forward, and to this end, includes the hinge 80 and the back mounting bracket 90.

As an example, the hinge 80 includes a pair of the first hinge 80A and the second hinge 80B connecting the cushion frame 3 and the back frame 8 to be spaced apart from each other at an interval, and is integrated to an operation in which the seat cushion 2 (i.e., the cushion frame 3) moves forward by the forward movement of the sliding member 30 (i.e., the rack gear rod 31) by the driving of the motor 20, thereby serving to adjust the angle of the seatback 7 (i.e., the back frame 8) to perform the reclining. In this case, each of the first and second hinges 80A, 80B of the hinge 80 connects the hinge links coming from the cushion frame 3 and the back frame 8 by a hinge pin 80-1.

As an example, the back mounting bracket 90 includes a pair of the left back mounting bracket 90A and the right back mounting bracket 90B, and is fixed to each of the left/right cross ends 9A, 9B of the back frame cross bar 9 and is welded to the vehicle body part (not illustrated) to connect the back frame 8 to the vehicle body, and receives an operation force of the motor 20 to allow a fixed shaft 90-1 within the hinge to move in a shaft long hole 91 (see FIG. 6) such that the back frame 8 rotates at a reclining angle with respect to the shaft long hole 91.

Meanwhile, FIGS. 2 to 6 illustrate a detailed structure of each of the linear movement devices 100, the sliding movement devices 200, and the reclining angle change device 90 configuring the railless sliding mechanism 10.

Figure 3:
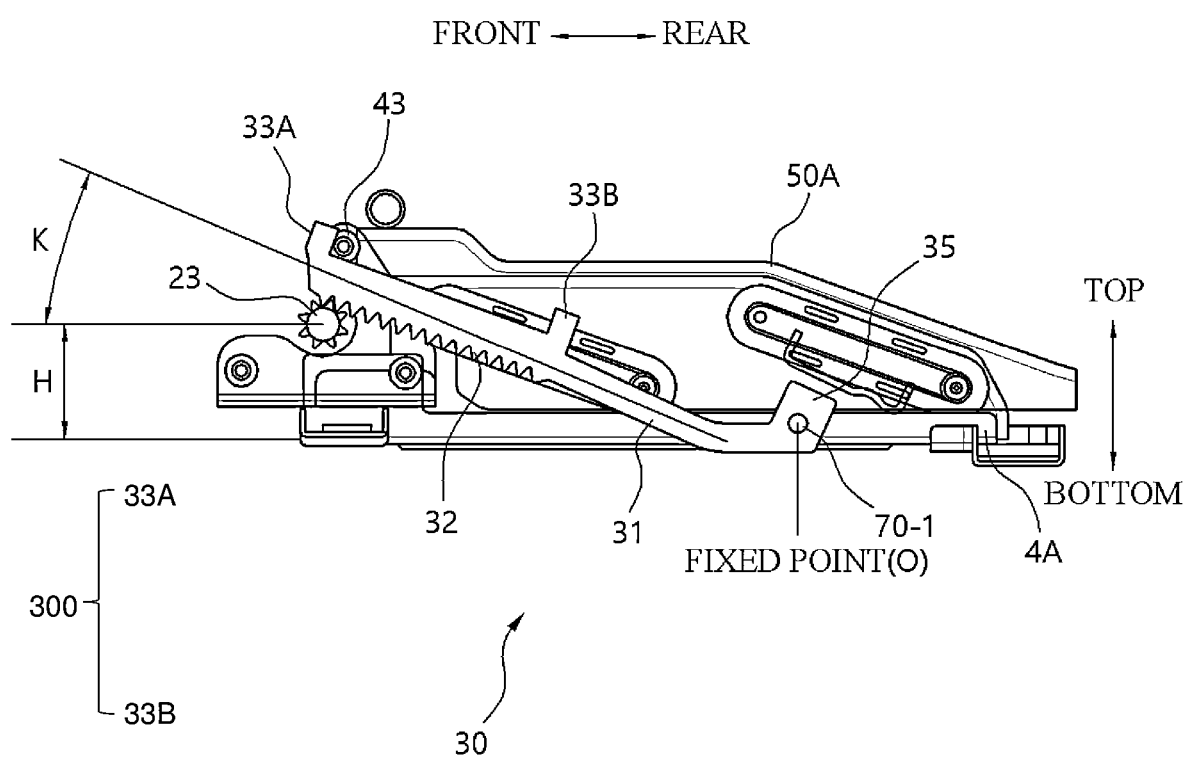
FIG. 3 is a diagram illustrating an example of the layout of the motor and the sliding member according to one form of the present disclosure.

Referring to the linear movement device 100 illustrated in FIGS. 2 and 3, the motor 20 and the sliding member 30 are disposed using the motor mounting bracket 40 coupled to the left cushion mounting bracket 4A in a left direction which is one direction of the left/right directions of the cushion seat 3. In this case, the motor 20 and the sliding member 30 may be disposed in a right direction, which is an opposite direction of the left/right directions of the cushion seat 3, using the motor mounting bracket 40 coupled to the right cushion mounting bracket 4B.

Specifically, the motor 20 of the components of the motor 20 and the sliding member 30 includes a motor reducer 21 and the pinion gear 23, and the sliding member 30 includes the rack gear rod 31.

As an example, the motor 20 is rotated in a forward/reverse direction by a driving signal of an operation button (not illustrated) and delivers forward/reverse direction rotating forces to the motor reducer 21. The motor reducer 21 includes a gear decreasing or increasing a torque by decreasing or increasing the torque by the rotating force of the motor and rotates the pinion gear 23. The pinion gear 23 generates an output of the motor 20 going through the motor reducer 21 by the rotating force. In this case, the motor 20 receives a reclining motor signal (a) of the operation button (not illustrated) to be driven by a power source supplied from a vehicle or a battery, and applies a general motor but may be a step motor.

Particularly, the motor 20 and/or the motor reducer 21 are fastened by a bolt or fixed by welding to the motor mounting bracket 40. Further, the motor 20 and the motor reducer 21 are orthogonal to each other, such that an output of the motor and an output of the motor reducer are orthogonal to each other, and the motor reducer 21 and the pinion gear 23 are arranged coaxially to form the same rotating directions as each other.

Specifically, the sliding member 30 includes the rack gear rod 31 arranged to be parallel with the motor 20, and the rack gear rod 31 forms the rack gear 32, sliding stoppers 300, and a fixed end 35.

As an example, the rack gear 32 is formed on the bottom surface of the rack gear rod 31 whereas the sliding stoppers 300 are formed on the upper surface of the rack gear rod 31. In this case, the sliding stoppers 300 are formed as a front end protrusion 33A and a rear end protrusion 33B, and an interval pin 43 of the motor mounting bracket 40 is positioned at an interval between the front end protrusion 33A and the rear end protrusion 33B, thereby constraining the forward movement of the rack gear rod 31 (i.e., the sliding movement of the cushion seat 2) by the rear end protrusion 33B and constraining the backward movement thereof (i.e., the initial position returning movement of the cushion seat 2) by the front end protrusion 33A.

Therefore, the interval between the front end protrusion 33A and the rear end protrusion 33B forms a sliding stroke (S), and the sliding stroke (S) is formed to be the same as a gear formation length of the rack gear 32.

As an example, the fixed end 35 is bent upward at the edge of the rack gear rod 31 and is fixed via a fixing bracket 71 and the hinge bolt 70-1 protruding toward the lower surface of the rear seat cross member 70.

Particularly, the pinion gear 23 and the rack gear 32 form a gear combination of being rotated while engaged with each other, and the gear combination forms the sliding angle (K) of the predetermined angle (i.e., acute angle) upward using the hinge bolt 70-1 as a fixed point. The reason of forming the sliding angle (K) is because the guide slot 61 (i.e., the front/rear inclination slots 61A, 61B) of the leg bracket 60 (i.e., the left/right leg brackets 60A, 60B), which penetrates front and rear slot pins 60-1, 60-2 slid and is moved together with the side upper bracket 50 (i.e., the left/right side upper brackets 50A, 50B), forms the same inclination as that of the sliding angle (K) (see FIG. 5).

As described above, the railless sliding mechanism 10 applies the gear combination using the pinion gear 23 and the rack gear 32 as a basic rotation-linear movement structure. In this case, a reclining height (H) formed by the pinion gear 23 with respect to the left/right cushion mounting brackets 4A, 4B is set to meet a seat cushion lifting height (h) (see FIG. 8) of the cushion seat 2.

Figure 4:
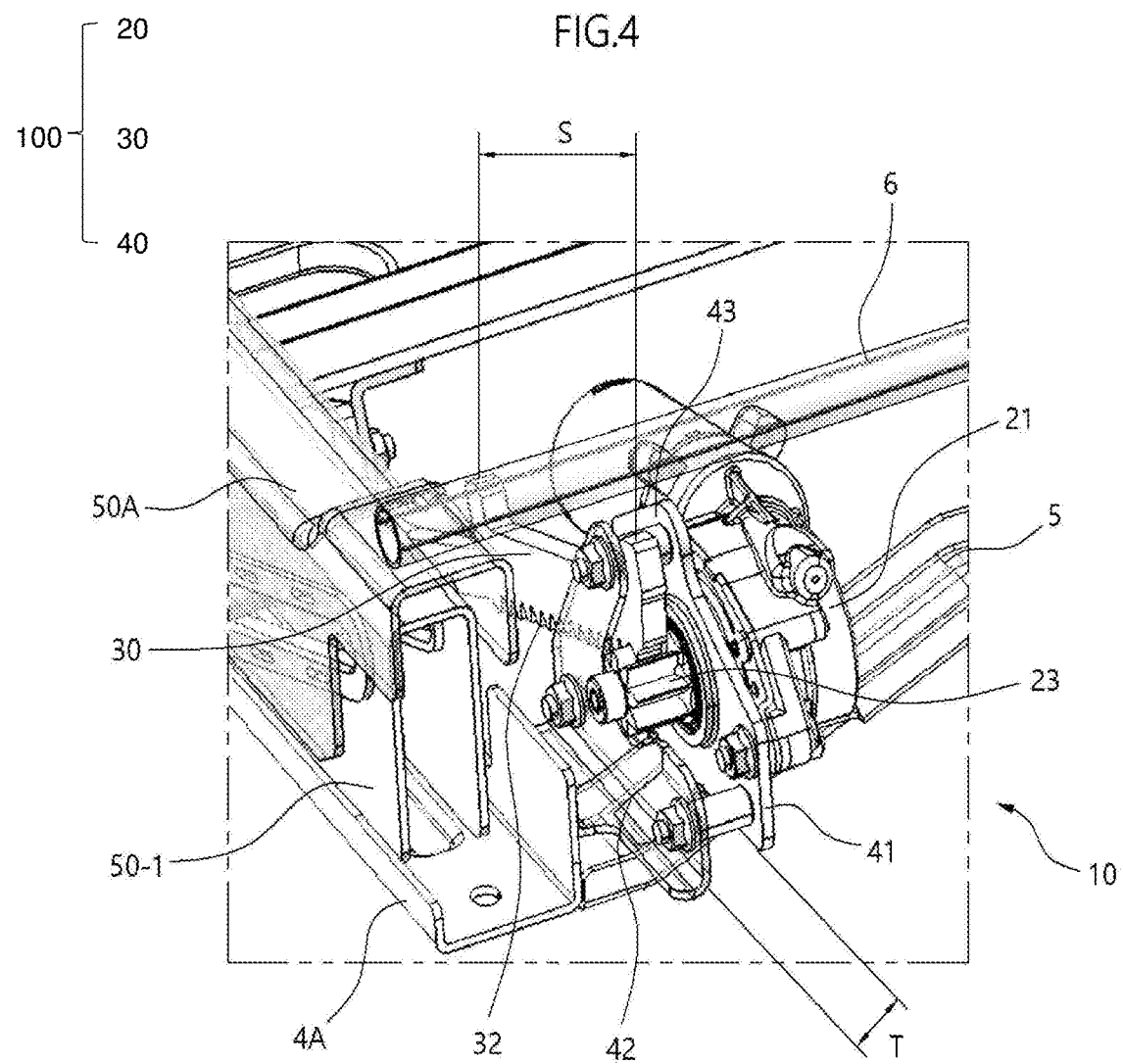
FIG. 4 is a diagram illustrating a detailed configuration of a motor mounting bracket of the linear movement device according to one form of the present disclosure.

Referring to the linear movement device 100 illustrated in FIG. 4, the motor mounting bracket 40 includes a motor plate 41, a seat plate 42, and a plurality of interval pins 43. In this case, the motor mounting bracket 40 is provided with only the left cushion mounting bracket 4A and not with the right cushion mounting bracket 4B.

Specifically, the motor plate 41 and the seat plate 42 are coupled by the interval pin 43 of a predetermined length in a state of facing each other to form a gear interval (T) by a length of the interval pin 43.

As an example, the motor plate 41 is fastened to a housing of the motor reducer 21 by a bolt or a screw, and positions the pinion gear 23 coming from a perforated opening hole at the gear interval (T). The seat plate 42 is fixed by welding or fastened by a bolt or a screw to the left cushion mounting bracket 4A.

As an example, a pair of three interval pins 43 are configured, including two lower interval pins connecting the lower portions of the motor plate 41 and the seat plate 42 and one upper interval pin connecting the upper portions thereof. In this case, the lower interval pin of the interval pin 43 is positioned between the front end protrusion 33A and the rear end protrusion 33B of the sliding stoppers 300 to serve as the stopper.

Referring to the sliding movement devices 200 illustrated in FIG. 5, the coupling relationship between the side upper bracket 50, the leg bracket 60, and the rear seat cross member 70 is illustrated. In this case, the side upper bracket 50 includes the left/right side upper brackets 50A, 50B, and the leg bracket 60 includes the left/right leg brackets 60A, 60B, but they are configured as the same structures, such that the left side upper bracket 50A and the left leg bracket 60A will be described as an example.

Specifically, the left side upper bracket 50A has about a "Π" section and includes an upper bracket body forming at least one bending portion in a longitudinal direction while surrounding the left leg bracket 60A, and one side surface of the upper bracket body is fixed to one edge of the rear seat cross member 70 by welding. Further, the left leg bracket 60A includes a leg bracket body with about a "Π" section so as to be inserted into the left side upper bracket 50A in a state of being fixed to the left cushion mounting bracket 4A by welding.

Therefore, upon the sliding movement by the gear combination of the pinion gear 23 and the rack gear 32, the left side upper bracket 50A is movable together with the rear seat cross member 70 whereas the left leg bracket 60A maintains the fixed state together with the left cushion mounting bracket 4A fixed to the vehicle body (not illustrated).

Particularly, the left side upper bracket 50A and the left leg bracket 60A are connected by the front and rear slot pins 60-1, 60-2, and the front and rear slot pins 60-1, 60-2 penetrate a pin long hole 51 perforated in the side surface of the upper bracket body of the left side upper bracket 50A and the guide slot 61 perforated in the side surface of the leg bracket body of the left leg bracket 60A.

As an example, the pin long hole 51 includes a front inclination long hole 51A and a rear inclination long hole 51B to be spaced apart from each other at an interval, and the guide slot 61 includes a front inclination slot 61A and a rear inclination slot 61B. In this case, separation intervals of the front/rear inclination long holes 51A, 51B and the front/rear inclination slots 61A, 61B are set to be equal to the sliding stroke (S), and inclination angles of the front/rear inclination long holes 51A, 51B and the front/rear inclination slots 61A, 61B are set to be equal to the sliding angle (K).

Therefore, upon the sliding movement by the gear combination of the pinion gear 23 and the rack gear 32, the front and rear slot pins 60-1, 60-2 move along the inclination angles of the front/rear inclination long holes 51A, 51B and the front/rear inclination slots 61A, 61B and thus may be consistent with the movement of the rack gear rod 31 moving to the sliding angle (K).

However, the front/rear inclination long holes 51A, 51B may be formed of a simple hole through which the front and rear slot pins 60-1, 60-2 are fitted and penetrates, and this is because the slot pin 60-1 moves along the front/rear inclination slots 61A, 61B.

As an example, the rear seat cross member 70 has both edges fixed to the inner portions of the upper bracket body of the left side upper bracket 50A and the right side upper bracket 50B, respectively, by welding and thus is integrated with the left/right side upper brackets 50A, 50B to move together.

Figure 6:
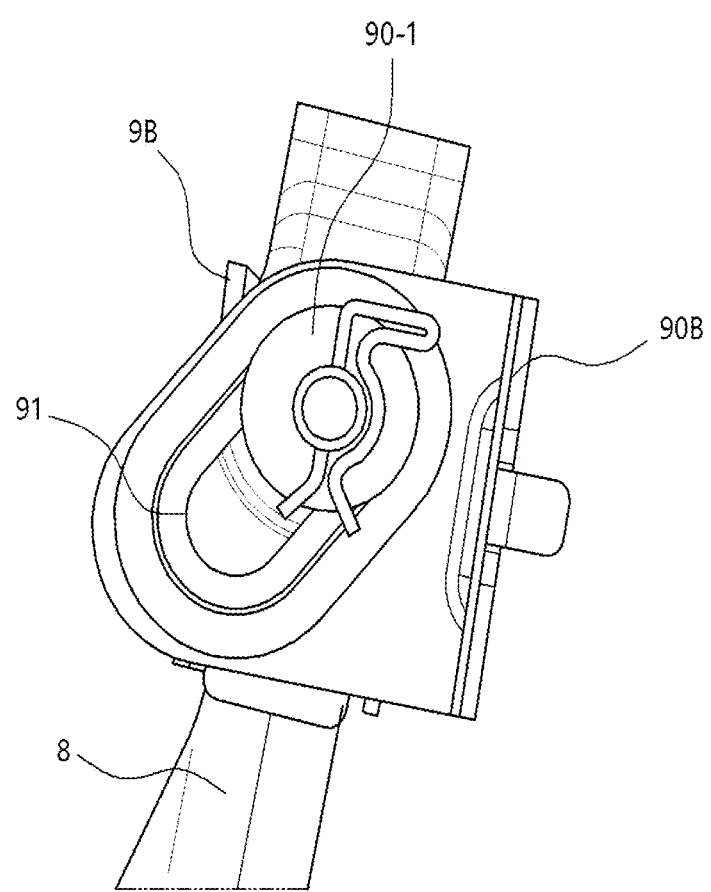
FIG. 6 is a diagram illustrating a configuration of a reclining angle change device configuring the railless sliding mechanism according to one form of the present disclosure.

Referring to the reclining angle change device 90 illustrated in FIG. 6, the back mounting bracket 90 is fixed to the vehicle body (not illustrated) such that there is no movement, and includes the left back mounting bracket 90A and the right back mounting bracket 90B and is fixed to a left cross end 9A and a right cross end 9B of the back frame cross bar 9.

Further, each of the left/right back mounting brackets 90A, 90B forms the shaft long hole 91 inclined at the reclining angle, and the fixed shaft 90-1 fastened by a screw or fixed by welding to the left/right portions of the back frame 8 is fitted into the shaft long hole 91.

Therefore, upon the sliding movement by the gear combination of the pinion gear 23 and the rack gear 32, the fixed shaft 90-1 moves along the shaft long hole 91 in a state where the back frame cross bar 9 and the back mounting bracket 90 are fixed, such that the back frame 8 connected by the hinge 80 may perform the reclining angle adjustment by the downward (or upward) inclination movement.

Figure 7:
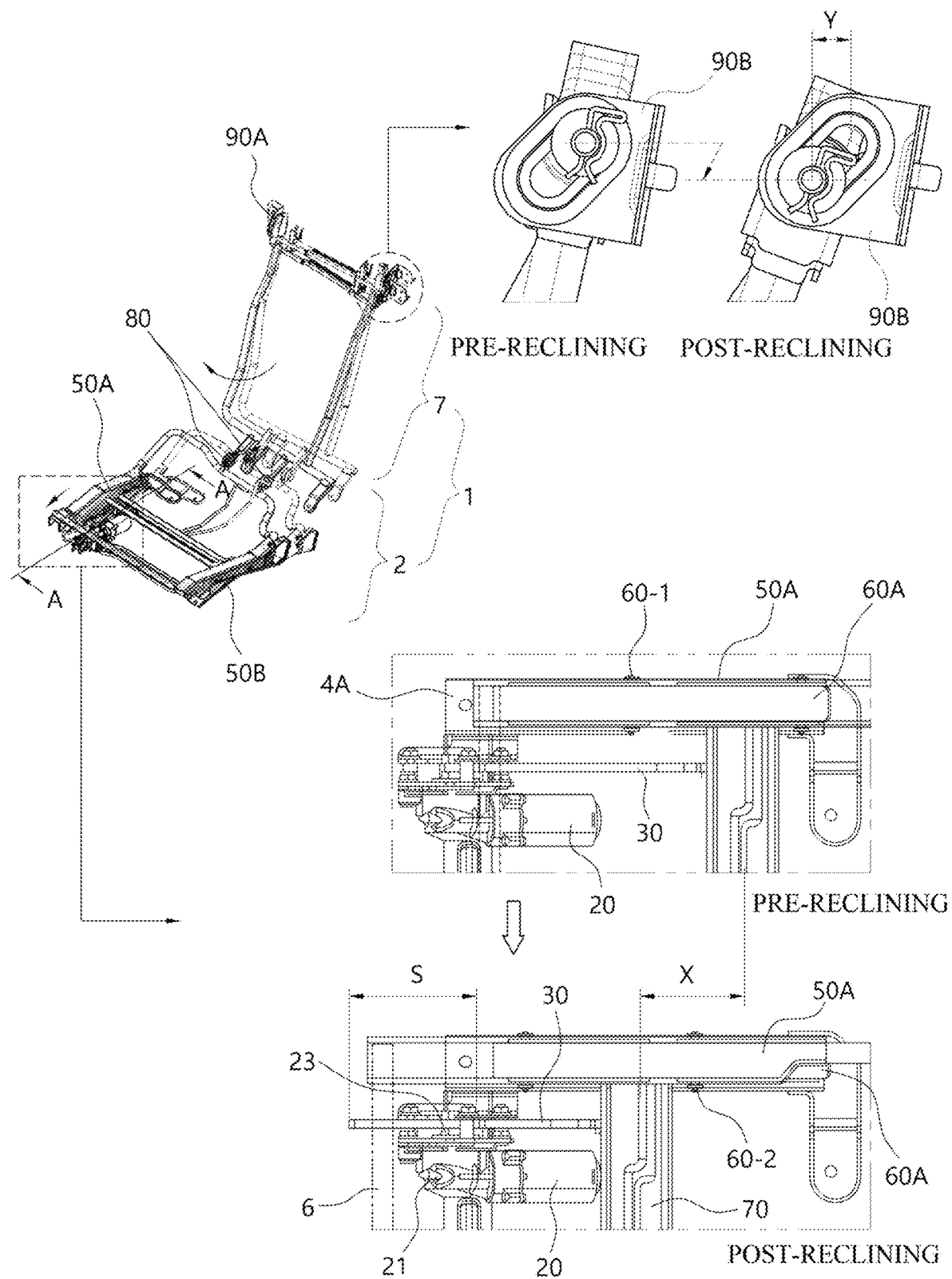
FIG. 7 is a diagram illustrating an operation state of the railless sliding mechanism applied to the rear seat according to one form of the present disclosure.
Figure 8:
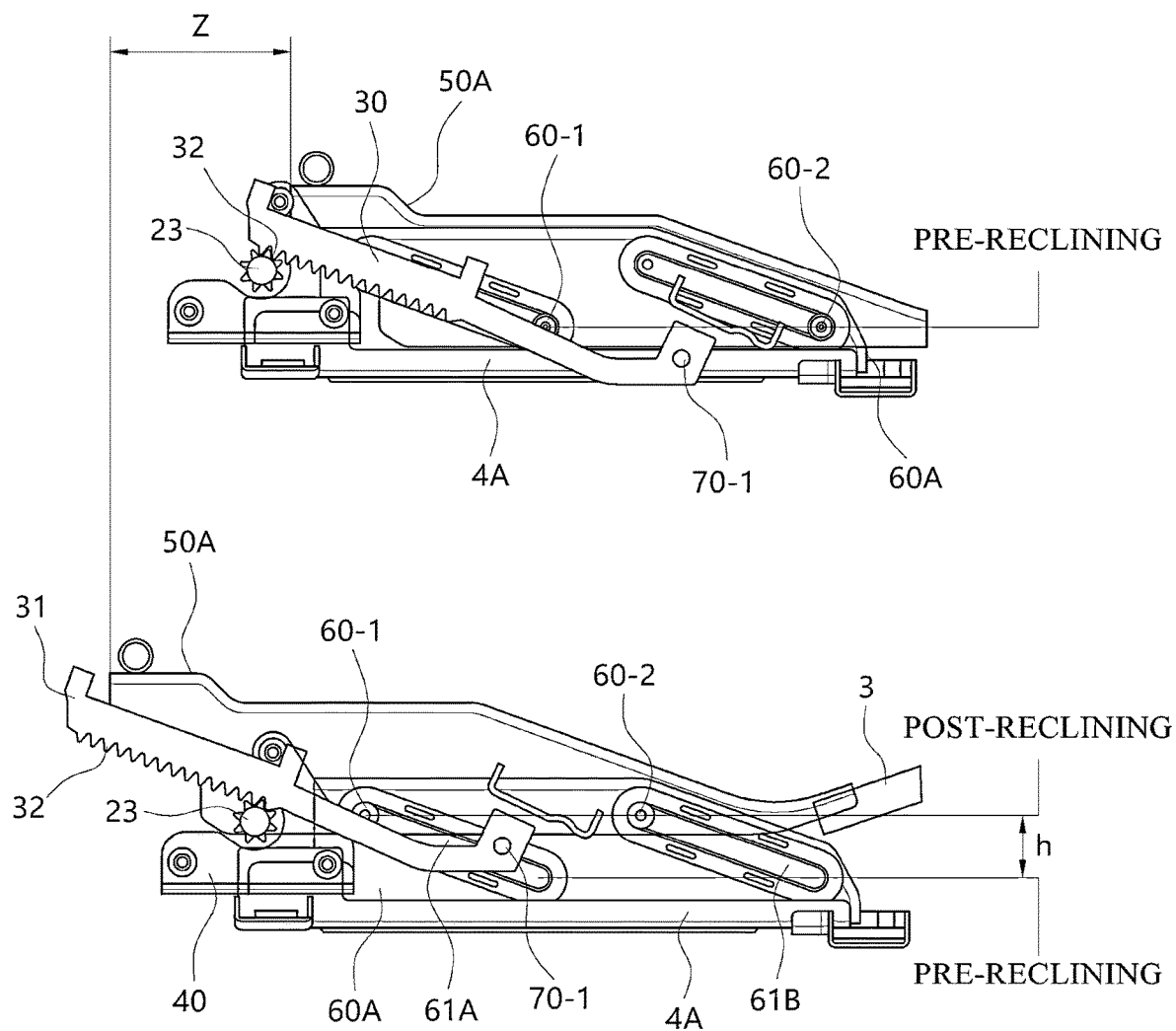
FIG. 8 is a diagram illustrating a sliding operation state of a seat cushion by a combination of the linear movement device and the sliding movement device configuring the railless sliding mechanism according to one form of the present disclosure.

Meanwhile, FIGS. 7 and 8 illustrate operation states where the linear movement device 100 of the railless sliding mechanism 10 allow the rear seat 1 to perform the sliding movement and the reclining angle change through an operation of the sliding movement devices 200 and the reclining angle change device 90 using the gear combination.

In this case, it will be described that the rotation of the motor 20 is a forward rotation, the rotation of the pinion gear 23 is the rotation in a counterclockwise direction, and the movement of the rack gear rod 31 is a forward movement by the rack gear 32. Further, for clarity of explanation, the left side upper bracket 50A and the left leg bracket 60A will be described as an example.

First, as illustrated in FIG. 2, the motor 20 is driven by a power supply together with the reclining motor signal (a) of the operation button (not illustrated).

Next, referring to FIG. 7, the rotation of the motor 20 is delivered to the pinion gear 23 through the motor reducer 21, and the rotation of the pinion gear 23 is delivered to the rack gear rod 31 through the rack gear 32 engaged with the pinion gear 23, such that the rack gear rod 31 starts to move forward in the state of forming the sliding angle (K).

As a result, the rear seat 1 is converted from a pre-reclining state to a post-reclining state, thereby implementing the reclining angle change in which the seatback 7 is reclined by the forward movement of the seat cushion 2.

More specifically, when the entry is made from the pre-reclining state to the post-reclining state, the forward movement of the rack gear rod 31 pulls the rear seat cross member 70 connected by the hinge bolt 70-1, such that the left side upper bracket 50A fixed to the rear seat cross member 70 by welding is pulled together with the rear seat cross member 70 and is moved forward.

As a result, the forward movement of the rack gear rod 31 is done up to the sliding stroke (S), and at the same time, the forward movement of the left side upper bracket 50A and the rear seat cross member 70 is done up to a seat cushion movement distance (X). At this time, the left leg bracket 60A is in a state of being fixed to the left cushion mounting bracket 4A, thereby maintaining a stationary state.

Referring to FIG. 8, the seat cushion movement distance (X) is implemented by the movement of the front and rear slot pins 60-1, 60-2.

That is, the front and rear slot pins 60-1, 60-2 are positioned in the front/rear inclination long holes 51A, 51B of the left side upper bracket 50A in the state of penetrating the front/rear inclination slots 61A, 61B of the left leg bracket 60A and thus is moved together in the movement direction of the left side upper bracket 50A.

Then, the front and rear slot pins 60-1, 60-2 move along the sliding angle (K) of the front/rear inclination slots 61A, 61B, such that the movement of the front and rear slot pins 60-1, 60-2 form the seat cushion lifting height (h), and the forward movement of the left side upper bracket 50A forms a side upper bracket movement distance (Z).

As a result, the seat cushion 2 is lifted upward by the seat cushion lifting height (h) and at the same time, slides forward by the side upper bracket movement distance (Z), and such a movement of the seat cushion 2 is delivered to the seatback 7 through the hinge 80.

Referring back to FIG. 7, the first/second hinges 80A, 80B of the hinge 80 pull the back frame 8 of the seatback 7 downward by the movement by a combination of the seat cushion lifting height (h) and the side upper bracket movement distance (Z) via the hinge pin 80-1.

Then, the fixed shaft 90-1 moves downward along the inclination direction of the shaft long hole 91 formed in the right back mounting bracket 90B (and the left back mounting bracket 90A) and is moved by a seatback reclining distance (Y), and allows the back frame 8 to move downward by the seatback reclining distance (Y), such that a reclining angle of the seatback 7 is changed by the seatback reclining distance (Y).

As described above, the railless sliding mechanism 10 adjusts the angle of the seatback by the reclining in which the back frame 8 of the seatback 7 is interlocked while performing the front/rear linear motion for the cushion frame 3 of the seat cushion 2 by the motor 20 and the gear combination of the pinion gear 23 and the rack gear 32, such that the rear seat 1 is characterized by the railless variable seatback type rear seat.

Figure 9:
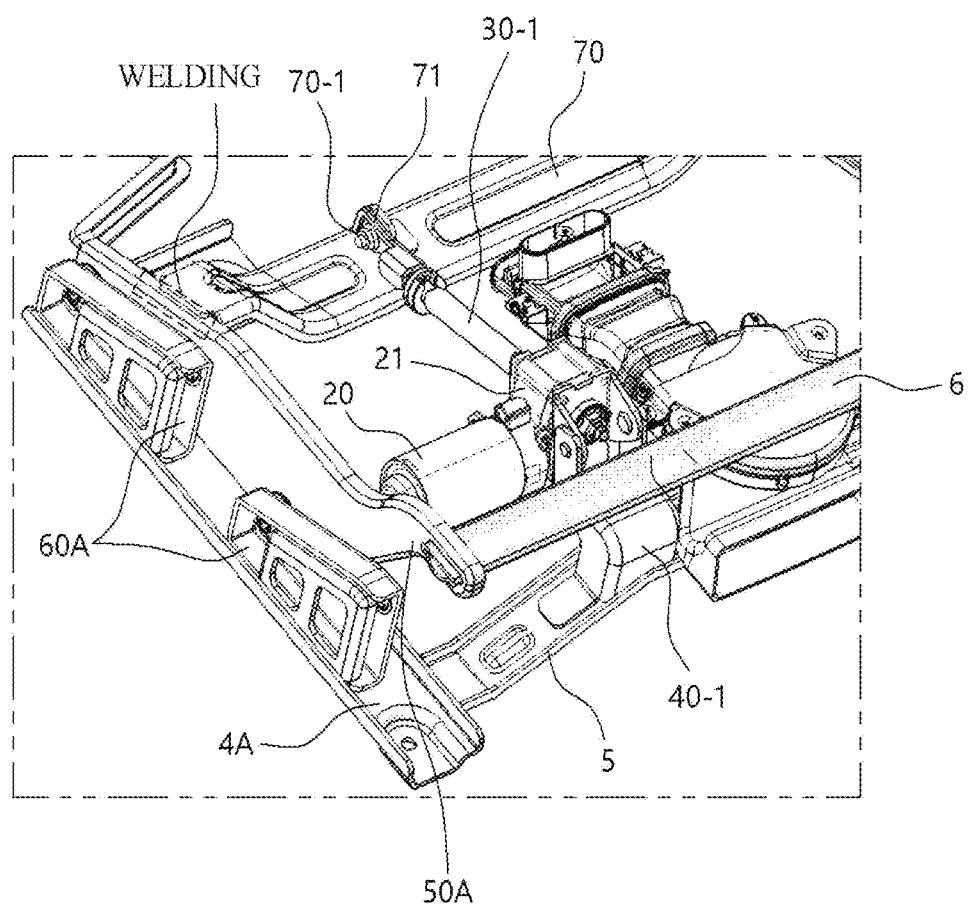
FIG. 9 is a diagram illustrating a configuration in which the linear movement device configuring the railless sliding mechanism according to one form of the present disclosure is modified into a lead screw.
Figure 10:
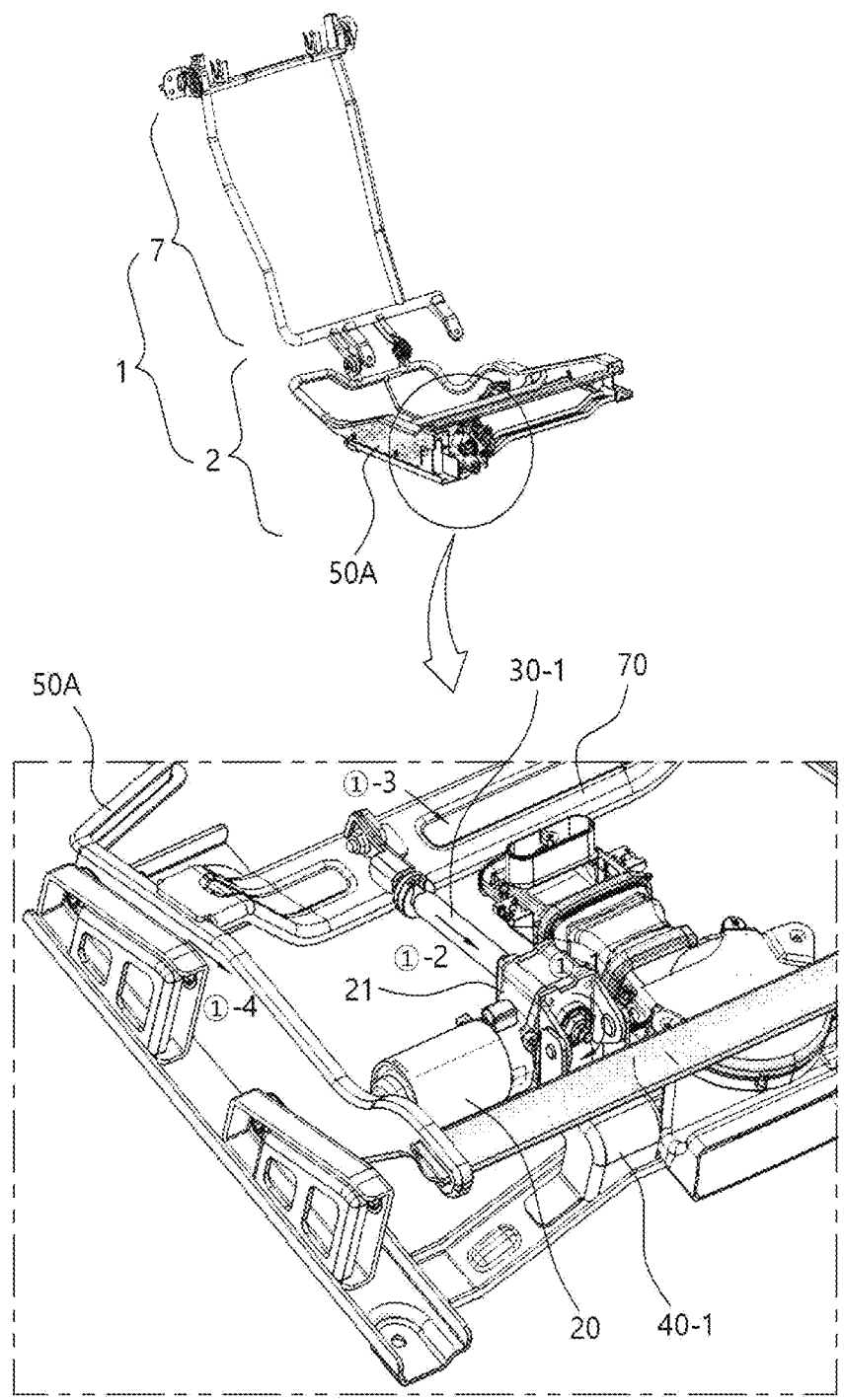
FIG. 10 is a diagram illustrating a reclining operation state of the rear seat using the lead screw according to one form of the present disclosure.

Meanwhile, FIGS. 9 and 10 illustrate an example of modifying the railless sliding mechanism 10 into the lead screw combination of the motor 20 and the lead screw 30-1.

Referring to FIG. 9, the railless sliding mechanism 10 has a difference compared to that of FIGS. 1 to 8 in that some components are changed by substituting the sliding member 30 of the pinion gear 23 and the rack gear 32 with the lead screw 30-1, and substituting the motor mounting bracket 40 with the cross member bracket 40-1.

As an example, the motor 20 delivers the rotating force to the motor reducer 21, and the lead screw 30-1 is directly connected to the motor reducer 21 to convert the rotation of the motor reducer 21 into the front/rear linear movement.

As an example, the rear seat cross member 70 forms the fixing bracket 71 on the upper surface portion of the rear seat cross member 70 and is fixed to the lead screw 30-1 by the hinge bolt 70-1.

Therefore, there is an advantage in that the lead screw combination may form the layout of the railless sliding mechanism 10 on the central portion of the seat cushion 2.

Further, compared to that of FIGS. 1 to 8, the motor mounting bracket 40 of the railless sliding mechanism 10 is fixed to the front cross member 5 by welding to be fastened to the housing of the motor reducer 21 by a bolt or a screw, such that compared to that of FIGS. 1 to 8, the motor mounting bracket 40 of the railless sliding mechanism 10 does not form the gear interval (T), thereby simplifying the shape and structure of the motor mounting bracket 40.

Referring to FIG. 10, it may be seen that only a difference is that the railless sliding mechanism 10 implements the reclining angle change operation by the lead screw combination compared to that of FIGS. 1 to 8.

As illustrated, the driving of the motor 20 rotates the motor reducer 21, the rotation of the motor reducer 21 is delivered to the lead screw 30-1, and the lead screw 30-1 converts the rotation into the linear motion, thereby pulling the rear seat cross member 70.

Then, the rear seat cross member 70 moves the left/right side upper brackets 50A, 50B fixed by welding together in the same direction, and in the state where the left/right side upper brackets 50A, 50B are fixed to the left/right leg brackets 60A, 60B, the front and rear slot pins 60-1, 60-2 perform the linear motion along the front/rear inclination long hole 51A, 51B and the front/rear inclination slots 61A, 61B.

As a result, as illustrated in FIGS. 7 and 8, the seat cushion 2 and the seatback 7 form the seat cushion movement distance (X), the seat cushion lifting height (h), the side upper bracket movement distance (Z), and the seatback reclining distance (Y), such that the reclining angle of the seatback 7 is changed.

As described above, the railless sliding mechanism 10 adjusts the angle of the seatback by the reclining in which the back frame 8 of the seatback 7 is interlocked while performing the front/rear linear motion for the cushion frame 3 of the seat cushion 2 by the screw combination of the motor 20 and the lead screw 30-1, such that the rear seat 1 is characterized by the railless variable seatback type rear seat.

Figure 12:
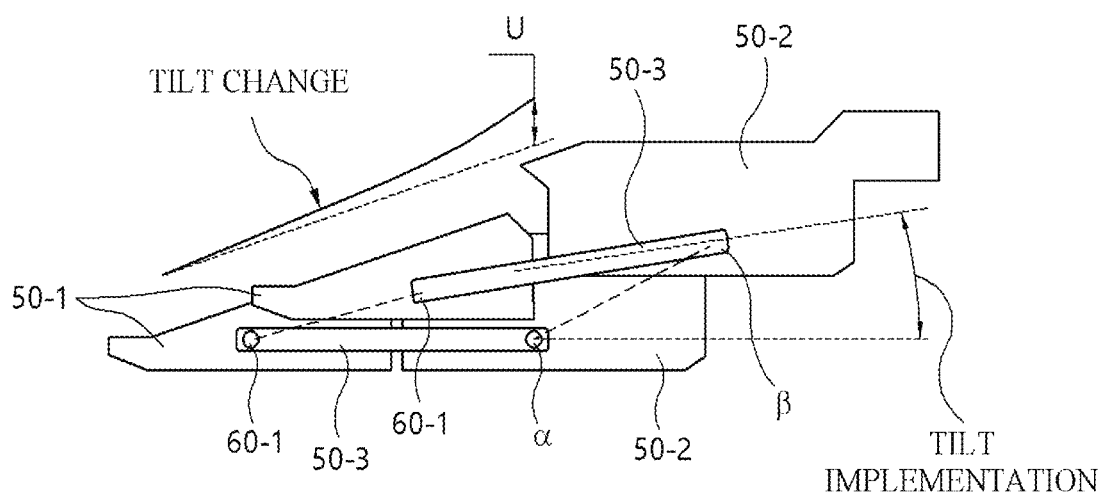
FIG. 12 is a diagram illustrating an operation state where a cushion seat of the rear seat is tilted by the tilt mechanism according to one form of the present disclosure.

Meanwhile, FIGS. 11 and 12 illustrate an example of combining a tilting function of the cushion seat 2 with the railless sliding mechanism 10.

Referring to FIG. 11, the side upper bracket 50 of the railless sliding mechanism 10 is connected to a tilt link 50-3 compared to that of FIGS. 1 to 8.

To this end, the side upper bracket 50 includes the left side upper bracket 50A and the right side upper bracket 50B, in which the left side upper bracket 50A includes a side upper movement bracket 50-1 and a side upper tilt bracket 50-2, and the right side upper bracket 50B includes the side upper movement bracket 50-1 and the side upper tilt bracket 50-2.

As an example, the side upper movement bracket 50-1 forms a reference long hole 52 into which the front and rear slot pins 60-1, 60-2 instead of the pin long hole 51 are fitted, and the side upper tilt bracket 50-2 forms a tilt long hole 53 into which the front and rear slot pins 60-1, 60-2 instead of the pin long hole 51 are fitted. Further, each of the left/right leg brackets 60A, 60B of the leg bracket 60 is formed with a reference inclination slot 61C and a tilt inclination slot 61D instead of the front/rear inclination slots 61A, 61B.

Therefore, the front and rear slot pins 60-1, 60-2 penetrate the reference long hole 52 and the reference inclination slot 61C in the coupling state of the side upper movement bracket 50-1 and the left leg bracket 60A (and the right leg bracket 60B), and penetrates the tilt long hole 53 and the tilt inclination slot 61D in the coupling state of the side upper tilt bracket 50-2 and the left leg bracket 60A (and the right leg bracket 60B).

Further, the front and rear slot pins 60-1, 60-2 are coupled to the tilt link 50-3, and the tilt link 50-3 implements a cushion seat tilting operation of lifting the side upper tilt bracket 50-2 while interlocking the movement of the side upper movement bracket 50-1 and the side upper tilt bracket 50-2 in a state where the side upper tilt bracket 50-2 is overlapped and coupled with the side upper movement bracket 50-1.

Furthermore, the cushion seat tilting operation is implemented using the reference long hole 52 and the tilt long hole 53 of the side upper movement bracket 50-1, and the reference inclination slot 61C and the tilt inclination slot 61D of the left leg bracket 60A (and the right leg bracket 60B). In this case, the reference long hole 52 and the tilt long hole 53 may be formed in a hole structure through which the front and rear slot pins 60-1, 60-2 penetrate.

As an example, when setting, as a reference value, a reference inclination angle (a) formed by the reference long hole 52 and the reference inclination slot 61C upward, a tilt inclination angle (13) formed by the tilt long hole 53 and the tilt inclination slot 61D upward is set at a greater angle.

Therefore, the seat cushion 2 may be lifted by an upward angle difference ($\beta-\alpha$) between the tilt inclination angle ($\beta$) and the reference inclination angle ($\alpha$). To this end, a tilt movement stroke of the tilt link 50-3 is formed to be longer than the sliding stroke (S), and the tilt movement stroke is variably set according to the tilt degree of the cushion seat 2.

FIG. 12 illustrates the tilting operation of the rear seat 1 which is performed before or after the reclining operation by the railless sliding mechanism 10 by connecting the side upper bracket 50 of the railless sliding mechanism 10 to the tilt link 50-3 compared to that of FIGS. 1 to 7.

As illustrated, the left side upper bracket 50A performs the forward movement (see FIG. 7) together with the rear seat cross member 70 with respect to the fixed left leg bracket 60A by pulling the rear seat cross member 70 through the gear combination of the pinion gear 23 and the rack gear 32 by the motor 20 and the motor reducer 21.

Then, the forward movement of the side upper movement bracket 50-1 and the side upper tilt bracket 50-2 of the left side upper bracket 50A is performed up to the sliding stroke (S) to perform the reclining angle change of the seatback 7, and then the upward tilting movement of the seat cushion 2 is performed by the tilt link 50-3 following the movement of the sliding stroke (S) due to the continuous driving of the motor 20.

As an example, in the case of the upward tilting movement of the seat cushion 2, the movement of the rear seat cross member 70 according to the continuous driving of the motor 20 moves the side upper movement bracket 50-1 and the side upper tilt bracket 50-2 by the tilt link 50-3, such that in a state where the front and rear slot pins 60-1, 60-2 stop in the reference long hole 52 (or the reference inclination slot 61C) of the side upper movement bracket 50-1, the tilt link 50-3 may be further moved.

Then, in a state where there is no movement of the side upper movement bracket 50-1 at the tilt inclination angle ($\beta$) having the upward angle difference ($\beta$-$\alpha$) with the reference inclination angle ($\alpha$) connected to the front and rear slot pins 60-1, 60-2, the tilt link 50-3 further pushes the side upper tilt bracket 50-2 by the upward angle difference (13-$a$), such that the side upper tilt bracket 50-2 is lifted, and the upward movement of the side upper tilt bracket 50-2 may form a seat cushion tilt height (U) to change the cushion seat 2 at the seat cushion tilt height (U) in a state where the seatback 7 completes the reclining angle change at the seatback reclining distance (Y).

Therefore, the cushion seat 2 may perform the tilt operation of being lifted by the seat cushion tilt height (U) by the movement using the upward angle difference ($\beta$-$\alpha$) of the tilt link 50-3.

As described above, the railless variable seatback type rear seat 1 according to an exemplary form of the present application applies the railless sliding mechanism 10 to the seat cushion 2 and the seatback 7 connected to each other, in which the railless sliding mechanism 10 may implement the linear movement conversion of the motor rotation using the linear movement device 100, the sliding movement conversion in which the front or rear of the seat cushion 2 is pushed using the sliding movement devices 200, and the reclining movement conversion folded to the front of the seatback 7 or reclined to the rear of the seatback 7 using the reclining angle change devices 80, 90, thereby implementing the reclining operation for the seatback 7 by the gear mechanism combination of the motor 20 of the linear movement device 100 and the pinion gear 23/the rack gear 32 or the screw combination of the motor 20 and the lead screw 30-1, and particularly, extending the application area of the rear seat 1 with the seatback reclining function to the medium/small sedans in addition to the luxury sedan by removing the structure with the pair of rails causing the increase in the cost/the material cost/the weight.

What is claimed is:

1. A rear seat comprising:
a linear movement device configured to convert a rotation of a motor into a linear movement;
a sliding movement device configured to convert the linear movement into a sliding movement in which a seat cushion is pushed forward or backward; and
a reclining angle change device configured to:
convert the sliding movement into a reclining movement, and to fold a seatback, which is connected to the seat cushion, forward or to recline the seatback backward,
wherein the linear movement device includes:
the motor in which the rotation of the motor is generated;
a sliding member configured to convert the rotation of the motor into the linear movement and to generate, by the linear movement, the sliding movement for the sliding movement device; and
a motor mounting bracket configured to fix the motor on a first side portion of the seat cushion.

2. The rear seat of claim 1, wherein:
the motor and the sliding member are connected by a gear mechanism, and
the gear mechanism includes a pinion gear configured to receive the rotation of the motor, and a rack gear formed on a rack gear rod that performs the linear movement and configured to be engaged with the pinion gear.

3. The rear seat of claim 2, wherein:
the pinion gear is positioned at a gear interval of the motor mounting bracket, and
the rack gear rod is fixed to a rear seat cross member of the sliding movement device and form a sliding angle upward.

4. The rear seat of claim 2, wherein:
the rack gear rod forms a sliding stopper on an opposite side of the rack gear, and
the sliding stopper limits, by a sliding stroke, a movement distance of the sliding movement.

5. The rear seat of claim 4, wherein the sliding stopper includes a front end protrusion and a rear end protrusion contacting an interval pin of the motor mounting bracket, and
the sliding stroke sets an interval of the front end protrusion and the rear end protrusion.

6. The rear seat of claim 1, further comprising a motor reducer configured to connect the motor and the sliding member,
wherein the sliding member is a lead screw.

7. The rear seat of claim 1, wherein the sliding movement device includes:
a rear seat cross member configured to fix a sliding member of the linear movement device and forming a seat cushion movement distance by the sliding movement;
a side upper bracket fixed to the rear seat cross member and forming a side upper bracket movement distance by the sliding movement;
a leg bracket coupled such that the side upper bracket has a relative movement; and
a slot pin configured to allow the relative movement of the side upper bracket with respect to the leg bracket.

8. The rear seat of claim 7, wherein the rear seat cross member fixes the sliding member on a lower surface portion or an upper surface portion thereof.

9. The rear seat of claim 7, wherein the slot pin is positioned on a guide slot of the leg bracket and is configured to be moved together with the side upper bracket.

10. The rear seat of claim 9, wherein:
the guide slot includes a front inclination slot and a rear inclination slot, the front inclination slot and the rear inclination slot being spaced apart from each other at an interval, and
each the front inclination slot and the rear inclination slot including the slot pin positioned therein, and
each the front inclination slot and the rear inclination slot forms an upward inclination that aligns with a sliding angle of the linear movement device.

11. The rear seat of claim 1, wherein the sliding movement device includes:
a rear seat cross member fixing a sliding member of the linear movement device and forming a seat cushion movement distance by the sliding movement;
a pair of a side upper movement bracket and a side upper tilt bracket separated from each other, the pair configured to be moved together with the rear seat cross member by the sliding movement, to form a side upper bracket distance, and to increase a height of the seat cushion to a seat cushion tilt height;
a tilt link connecting the side upper movement bracket to the side upper tilt bracket;
a leg bracket coupled such that a side upper bracket has a relative movement; and
a slot pin fixed to the tilt link and configured to allow the relative movement of the side upper movement bracket and the side upper tilt bracket with respect to the leg bracket.

12. The rear seat of claim 11, wherein the slot pin is positioned on a guide slot of the leg bracket and is configured to be moved together with the side upper movement bracket and the side upper tilt bracket.

13. The rear seat of claim 12, wherein:
the guide slot includes a reference inclination slot and a tilt inclination slot, the reference inclination slot and the tilt inclination slot being spaced apart from each other at an interval,
the slot pin is positioned on each of the reference inclination slot and the tilt inclination slot, and
the tilt link provides the sliding movement to the side upper movement bracket and the side upper tilt bracket and allows the seat cushion tilt height to be formed by a relative movement of the side upper tilt bracket with respect to the side upper movement bracket.

14. The rear seat of claim 13, wherein an upward angle difference is formed by setting a tilt inclination angle of the tilt inclination slot to be greater than a reference inclination angle of the reference inclination slot.

15. The rear seat of claim 13, wherein the seat cushion tilt height is formed by an upward angle difference between the reference inclination slot and the tilt inclination slot.

16. The rear seat of claim 1, wherein the reclining angle change device includes:
a hinge connecting the seat cushion to a seat back; and
a back mounting bracket forming a shaft long hole and forming the reclining movement at a seatback reclining distance at which a fixing shaft fixed to the seatback moves in the shaft long hole.

17. The rear seat of claim 16, wherein the back mounting bracket is positioned on an upper portion of the seatback.

18. A rear seat comprising:
a linear movement device configured to convert a rotation of a motor into a linear movement;
a sliding movement device configured to convert the linear movement into a sliding movement in which a seat cushion is pushed forward or backward; and
a reclining angle change device configured to:
convert the sliding movement into a reclining movement, and to fold a seatback, which is connected to the seat cushion, forward or to recline the seatback backward,
wherein the sliding movement device includes:
a rear seat cross member configured to fix a sliding member of the linear movement device and forming a seat cushion movement distance by the sliding movement;
a side upper bracket fixed to the rear seat cross member and forming a side upper bracket movement distance by the sliding movement;
a leg bracket coupled such that the side upper bracket has a relative movement; and
a slot pin configured to allow the relative movement of the side upper bracket with respect to the leg bracket.

19. A rear seat comprising:
a linear movement device configured to convert a rotation of a motor into a linear movement;
a sliding movement device configured to convert the linear movement into a sliding movement in which a seat cushion is pushed forward or backward; and
a reclining angle change device configured to:
convert the sliding movement into a reclining movement, and to fold a seatback, which is connected to the seat cushion, forward or to recline the seatback backward,
wherein the linear movement device includes:
the motor in which the rotation of the motor is generated;
a sliding member configured to convert the rotation of the motor into the linear movement and to generate, by the linear movement, the sliding movement for the sliding movement device; and
a cross member bracket configured to fix the motor on a center portion of the seat cushion.

* * * * *